United States Patent [19]

Pollizzi

[11] Patent Number: 5,262,197
[45] Date of Patent: Nov. 16, 1993

[54] SELF-SEALING THREADED FASTENER AND PROCESS FOR MAKING THE SAME

[75] Inventor: Mario Pollizzi, Rochester Hills, Mich.

[73] Assignee: Nylok Fastener Corporation, Rochester, Mich.

[21] Appl. No.: 856,453

[22] Filed: Mar. 24, 1992

Related U.S. Application Data

[62] Division of Ser. No. 621,512, Nov. 30, 1990, Pat. No. 5,141,375.

[51] Int. Cl.⁵ .............................................. B05D 3/02
[52] U.S. Cl. .................................... 427/195; 427/318; 427/388.1
[58] Field of Search .............. 411/258, 369, 446, 903; 427/195, 318, 388.1

[56] References Cited

U.S. PATENT DOCUMENTS

| | | | |
|---|---|---|---|
| 2,760,400 | 8/1956 | Mills et al. | 85/9 |
| 2,775,917 | 1/1957 | Ferguson | 85/36 |
| 3,022,197 | 2/1962 | Jedlicka | 117/132 |
| 3,061,455 | 10/1962 | Anthony | 117/37 |
| 3,146,142 | 8/1964 | Maly | 156/91 |
| 3,179,143 | 4/1965 | Schultz et al. | 151/41.7 |
| 3,247,752 | 4/1966 | Greenleaf et al. | 85/1 |
| 3,355,205 | 11/1967 | Wagner et al. | 287/189.36 |
| 3,428,614 | 2/1969 | Brownstein | 260/77.5 |
| 3,470,787 | 10/1969 | Mackie | 85/53 |
| 3,472,301 | 10/1969 | Pearce | 151/14.5 |
| 3,625,875 | 12/1971 | Frauenglass | 260/17 A |
| 3,720,533 | 3/1973 | Gallagher | 117/21 |
| 3,746,068 | 7/1973 | Deckert et al. | 151/14.5 |
| 3,757,828 | 9/1973 | Frauenglass et al. | 138/145 |
| 3,787,222 | 1/1974 | Duffy | 117/21 |
| 3,794,610 | 2/1974 | Bachmann et al. | 260/31.6 |
| 3,921,259 | 11/1975 | Brumlik | 24/204 |
| 3,952,948 | 4/1976 | Nelson et al. | 238/243 |
| 3,987,019 | 10/1976 | Gruber et al. | 526/328 |
| 4,362,450 | 12/1982 | Hasegawa et al. | 411/258 |
| 4,399,166 | 8/1983 | Wallace | 427/195 |
| 4,490,083 | 12/1984 | Rebish | 411/338 |
| 4,514,125 | 4/1985 | Stol | 411/82 |
| 4,657,460 | 4/1987 | Bien | 411/258 |
| 4,709,521 | 12/1987 | Walz | 52/220 |
| 4,712,957 | 12/1987 | Edwards et al. | 411/82 |
| 4,830,558 | 5/1989 | Sweeney | 411/258 |
| 4,927,307 | 5/1990 | Fitzgerald et al. | 411/302 |
| 5,018,329 | 5/1991 | Hasan et al. | 52/410 |

Primary Examiner—Michael Lusignan
Attorney, Agent, or Firm—Niro, Scavone, Haller & Niro

[57] ABSTRACT

A method of making a reusable, self-sealing threaded fastener having an integral seal and which does not require additional curing or heating after installation is disclosed. The sealant is a soft pliable olefin based material designed to flow between the bearing shoulder and threads of the fastener, and the abutting bearing surface of a receptacle as the fastener is tighted into the receptacle thereby creating a tight seal.

9 Claims, 2 Drawing Sheets

SELF-SEALING THREADED FASTENER AND PROCESS FOR MAKING THE SAME

This is a divisional of copending application Ser. No. 07/621512 filed on Nov. 30, 1990, now U.S. Pat. No. 5,141,375, patented Aug. 25, 1992.

BACKGROUND OF THE INVENTION

This invention relates to fasteners and is more specifically related to a self-sealing threaded fastener for sealing in cooperation with a complementary receptacle.

It is well known that helical threaded fasteners do not form water-tight engagement with a complementary surface or mating fastener unless a gasket or seal of some sort is supplied between the threaded portion of the fastener and the receptacle or fastener to seal the valleys created by the roots and crests of the threads. Such a gasket is shown in U.S. Pat. No. 2,775,917 issued to W. C. Ferguson on Jan. 1, 1957, which describes a sheet metal nut with an integral gasket that is adapted to flow into and fill the valleys created by the sheet metal thread.

It is also known to provide self-locking fasteners. By nature, such fasteners are not self-sealing. An example of a self-locking fastener is shown in U.S. Pat. No. 3,746,068 issued to Deckert et al on Jul. 17, 1973, which shows an encapsulated adhesive applied directly to the threads of a threaded fastener, wherein said adhesive is pressure actuated as the threaded fastener is turned into a tapped receptacle, for permanently bonding the threaded fastener in the receptacle. Many other similar type devices are known for providing self-locking threaded fasteners such as, by way of example, those shown in U.S. Pat. No. 3,061,455 issued to Anthony on Oct. 30, 1962 and U.S. Pat. No. 3,022,917 issued to Jedlicka on Feb. 20, 1962.

A self-sealing mechanical fastener with a self-contained gasket is shown in U.S. Pat. No. 3,472,301 issued to Pearce on Oct. 14, 1969. As there shown, a flowable sealant is introduced into a cavity provided in the center of the threaded shank of the screw fastener. A plurality of capillaries or channels communicate the sealant cavity with the peripheral threaded area of the shank. The screw fastener is used in typical fashion, and after being secured in a suitable receptacle, a dowel is placed into the sealant filled cavity for forcing the flowable sealant out through the capillaries into the valleys between the roots and crests of the threaded connection to provide for a seal.

The sealing mechanism used with threaded fasteners of the prior art all have the same disadvantage in that each requires a plurality of steps to both secure the fastener in the receptacle and to activate the sealing mechanism. For example, in U.S. Pat. No. 2,775,917 discussed above, the sealing nut must be applied directly to the male threaded fastener either before or after the male threaded fastener is used to secure a plurality of elements to one another. In U.S. Pat. No. 3,472,301, a dowel or similar tool must be used to activate the sealant after the threaded fastener is in place. In addition, the prior art sealing mechanisms are quite costly, and not as reusable as desired. Furthermore, the sealing mechanisms of the prior art do not provide adequate filling and sealing between the two mating fasteners in certain installations.

While the self-locking fasteners are designed to be self-energizing during the normal thread tightening function, the self-locking designs of the prior art are not intended to and do not provide a gasket-type sealing function.

SUMMARY OF THE INVENTION

The subject invention provides a threaded fastener with an integral sealing element, wherein the engaging surface of a threaded fastener includes a soft, pliable, flowable adhesive adhered thereto. As the threaded fastener is installed into a complementary receptacle, and the engaging surface is brought into abutting relationship with a complementary bearing surface on the receptacle, the sealant flows around the engaging surface and into the valleys created by the roots and crests of the threaded portion to provide a tight gasket-type seal between the fastener and the receptacle.

In its preferred form, the sealant is a soft, pliable thermoplastic such as, by way of example, an olefin, polyolefin or the like. The sealant may be applied by spray coating fine powdered particles of the material directly onto the engaging surface and thread area of a heated threaded fastener in sufficient quantities to build-up an appropriate gasket to provide proper sealing. In addition, the gasket, formed when cooled, promotes free flow of the sealant as the threaded fastener is installed and tightened into position in a suitable receptacle.

In the preferred form, the olefin coating may be sprayed directly onto a heated threaded fastener which when cooled, forms a sealing gasket. A vacuum source may be used to create a low pressure zone near the fastener during the spraying process to remove any excess sealant particles from the atmosphere preventing stray deposits on the fastener.

The threaded fastener with an integral sealant of the present invention has proven to provide a good moisture-tight gasket or seal between the fastener and a complementary receptacle. The sealant flows adequately into the openings between the engaging surface of the threaded fastener and the complementary bearing surface on the receptacle, as well as into the valleys created by the roots and crests of the threaded members.

It is, therefore, an object and feature of the subject invention to provide for a self-sealing threaded fastener. It is a further object and feature of the invention to provide for an integral gasket-type seal which is self-energized upon screw tightening the threaded fastener into a suitable receptacle It is an additional object and feature of the invention to provide for a method of making a threaded fastener with an integral sealing element. It is also an object of the present invention to provide a cost effective fastener having an integral sealing element which is reusable and has improved filling and sealing qualities.

Other objects and features of the invention will be readily apparent from the accompanying drawing and description.

DETAILED DESCRIPTION OF THE PREFERRED EMBODIMENT

Figure 1:
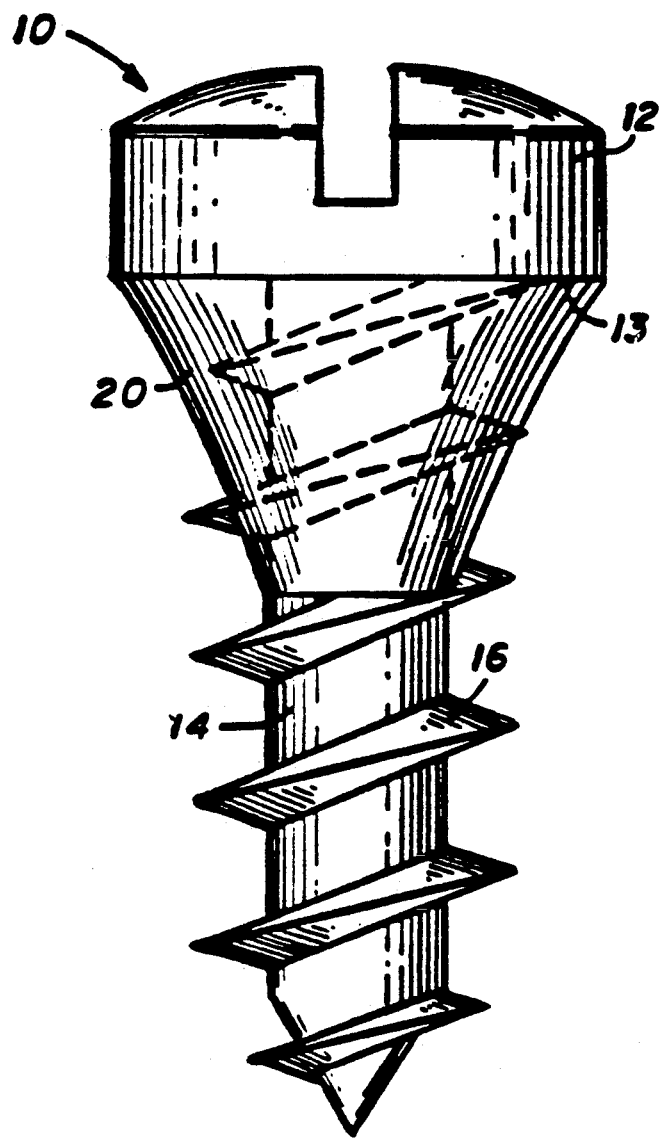
FIG. 1 is a plan view of a threaded fastener with an integral sealing element made in accordance with the present invention.

A threaded fastener in accordance with the present invention is illustrated in FIG. 1. As there shown, the fastener 10 is a male threaded fastener and includes an enlarged head 12 having a substantially flat radial bearing or engaging surface 13 and a shank 14 intersecting the engaging surface 13 and projecting outwardly therefrom. The shank 14 includes a helical thread 16 extending its entire length in the well known manner. As may be appreciated, the fastener 10 may be any type of threaded fastener including male and female threaded fasteners having a threaded portion and an adjacent engaging surface. As illustrated, fastener 10 is a male threaded fastener which may be straight tapered, as shown, or angle tapered depending on application, in the manner well known to those skilled in the art.

In the preferred embodiment of the subject invention, a sealing material 20 is applied to the area adjacent the engaging surface 13 and the upper end of the threaded shank 14. The sealing material 20 is a soft, pliable sealant such as a thermoplastic resin of the olefin or polyolefin type. A finely powdered olefin or polyolefin based material with a specific gravity of between 0.95 and 1.2 and a melting point of about 90° C. to about 120° C. (about 194° F. to about 248° F.) known as Corvell ® clear, part number 94-9002, manufactured by Morton International Specialty Chemicals Group of Reading, Pa., has been shown to be a suitable powdered material for defining a sealant material and providing the required sealing performance in accordance with the present invention.

Figure 2:
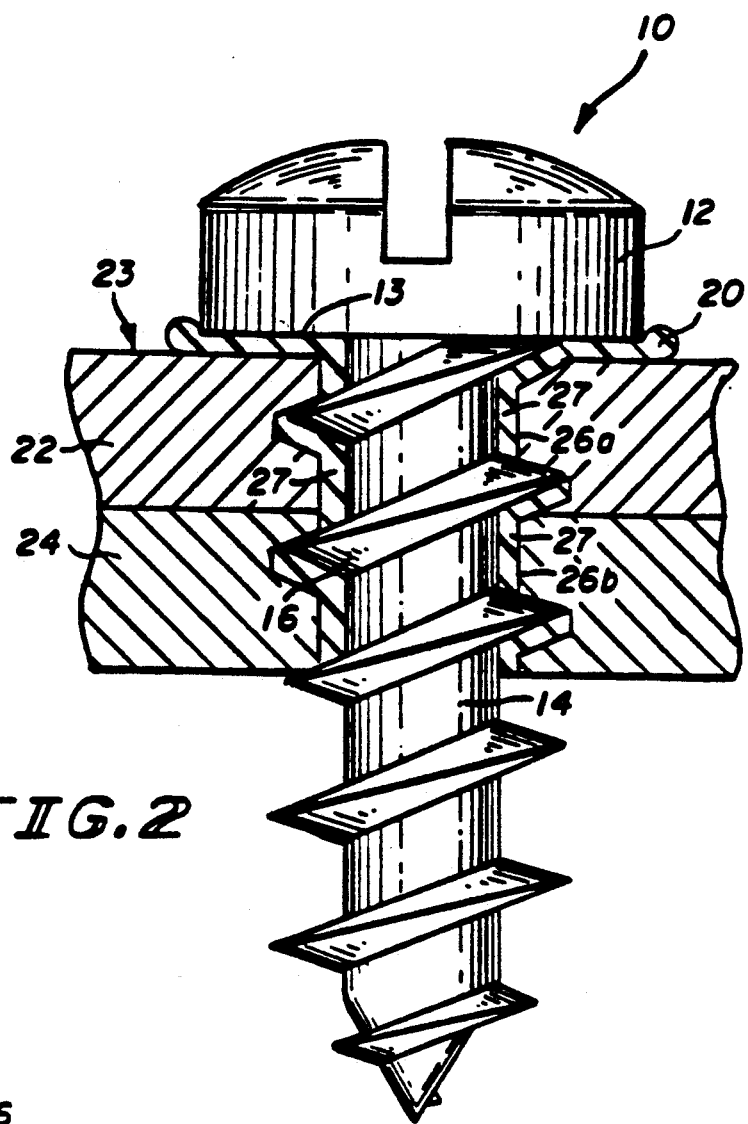
FIG. 2 is a side view, partially in section, of the threaded fastener of FIG. 1 shown as used, installed into an engaging receptacle.

As shown in FIG. 2, when a plurality of elements 22 and 24 are to be secured to one another by means of the threaded fastener 10, a suitable receptacle comprising the apertures 26a and 26b is provided in the elements 22 and 24 for receiving the shank 14 of the fastener 10. As the shank 14 is screw-tightened into the receptacles 26a and 26b, the engaging surface 13 is pulled into abutting relationship with the complementary bearing surface 23 of element 22. As the fastener 10 is turned into the receptacles 26a and 26b, the pliable, flowable sealant material 20 fills the valleys 27 defined by the roots and crests of the threads 16 and flows outwardly from the shank to fill the space between the surfaces 13 and 23 to provide a tight sealing element or gasket.

In practice, using the polyolefin powder coating described above for the sealing material 20, the present invention has been successfully employed as wheel hub lock fasteners for off-road four-wheel drive vehicles and meets the sealing requirement of test specifications set by the Ford Motor Company of Dearborn, Mich. for such wheel hubs. Specifically, fasteners of the present invention have been used on wheel hubs and provide a water-tight seal between the fastener and the secured element when the wheel hub is fully submerged in twenty-four (24) inches of standing water for a period of not less than two (2) minutes.

Furthermore, the self-sealing fastener of the present invention has been successfully employed to seal a case assembly housing electronic circuitry when the case was required to be secured to another member. Specifically, twelve (12) screws, similar to the threaded fastener 10 illustrated in FIG. 1, were threaded into and out of an engaging receptacle ten (10) times. It was found that the polyolefin material had remained unchanged and intact on all (12) screws and did not adversely affect the ability to thread the screw into proper engagement. Moreover, these twelve (12) screws were then used in assembly of a commercial case unit. The unit was fully submerged in water for 24 hours without any incidents of leakage from any of the self-sealing screws. Accordingly, reused sealing fasteners of the present invention still provide adequate sealing performance. Further, in these tests, it was found and concluded that the sealing fasteners of the present invention were superior to the prior art o-ring type seals in sealing performance, reusability and fastening retention.

Additional tests were conducted in which the fasteners of the present invention were placed in an environmental chamber where the temperature and humidity levels were varied as follows:

Eight (8) thirty minute cycles at 70° C. with 98% humidity alternated with eight (8) thirty minute cycles at −10° C. and thereafter, a one hour period to reach ambient temperature.

The fasteners of the present invention were subjected to two (2) of these nine hour cycles while installed in a commercial case assembly for electronic components as described above. This case assembly, after undergoing two (2) nine hour environmental chamber cycles, was submerged in standing water for twenty-four (24) hours. None of the installed fasteners of the present invention leaked whatsoever and all of these fasteners performed satisfactorily thereafter in a commercial installation.

The self-sealing fasteners of the subject invention may be used in conjunction with self-tapping screw forms as shown in FIG. 1, such as, by way of example, sheet metal screws and the like, or in conjunction with precision-threaded screws and nuts and tapped receptacles where a moisture-tight seal is required between the fastener and the secured element.

Figure 3:
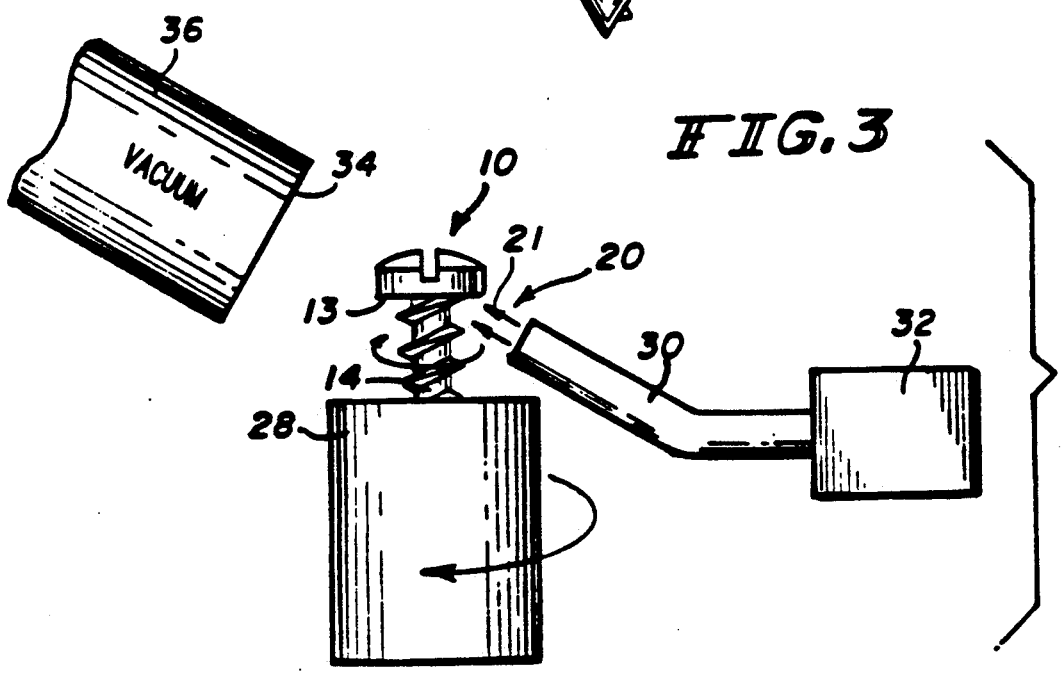
FIG. 3 is a diagrammatic illustration of a process for making a threaded fastener with an integral sealing element in accordance with the present invention.

A process for making a self-sealing threaded fastener 10 in accordance with the present invention is diagrammatically illustrated in FIG. 3. As there shown, the threaded fastener 10 is secured in a fixture 28 with the engaging surface 13 and the upper portion of the shank 14 exposed. The fasteners, including at least the head 12, the engaging surface 13 and the upper portion of shank 14, is then heated to a temperature above the melting point of the powdered coating material. The fastener is typically heated to between about 300° F. and about 550° F. and more preferably to between about 450° F. and about 525° F. Powdered coating material 20 is sprayed through nozzle 30, directly onto the heated shank 14 and engaging surface 13 of the fastener 10 as shown at arrows 21. A pressurized supply of the powdered coating material is supplied by pressure and supply source 32 in the well known manner. In practice, the nozzle has an orifice with the dimensions of approximately 1" long by approximately ⅛" high and the powdered coating particles are between about 17 micrometers and about 180 micrometers in diameter. The mean diameter particle size being about 104 micrometers. The powder is sprayed onto the engaging surface and shank of the threaded fastener at a pressure of approximately 34–45 standard cubic feet per hour (SCFH).

In the preferred embodiment of the invention, a vacuum source is provided at 36 with an exhaust opening as shown at 34 to remove excess powder particles from the atmosphere during the spraying process. The vacuum draws negative pressure sufficient to draw any excess powder particles away from the fastener thereby avoiding any unwanted powder application on the fastener. In the preferred embodiment the exhaust opening 34 is oval in shape and approximately 2" by 1" in size. However, any suitable vacuum exhaust opening can be used. In addition, it may be desirable to provide a secondary air source utilized as an air curtain (not shown) to prevent powder material from being applied in undesirable locations on the fastener.

The fixture 28 is designed to rotate 360° during the spraying process to provide uniform distribution of the powdered coating on the engaging surface and shank portion of the fastener 10. After the powdered coating is sprayed onto the heated fastener 10, a cooling liquid (not shown) is sprayed onto the fastener 10 to set the melted powdered coating material which has been melted onto and bonded to the fastener. This cooling liquid may be water, water with a rust inhibitor, additive or the like. Subsequently, the fastener 10 is removed from fixture 28. Removal may be accomplished by manually unthreading the fastener 10 from fixture 28 or, more preferably, fastener 10 is threaded onto fixture 28 by one thread thus allowing an air source to provide the force necessary to blow fastener 10 out of fixture 28. Finally, the coated sealing fasteners 10 are deposited into a cooling and rust inhibiting liquid prior to use or packaging for shipment.

While certain features and embodiments of the invention have been disclosed herein, it will be readily understood that the invention includes all modifications and enhancements within the scope and spirit of the following claims.

I claim:

1. A method of making a reusable, self-sealing threaded fastener having an integral seal, comprising the steps of:
    a. holding the fastener with an engaging surface and a threaded portion exposed for coating;
    b. heating at least the engaging surface and the threaded portion of the fastener;
    c. applying a sealant material to the threaded portion and the engaging surface and the intersection thereof such that said sealant material melts and bonds to the threaded portion and the engaging surface of the fastener; and
    d. curing the sealant material prior to installation of said fastener into a receiving member; said installation causing said sealant to form a watertight and airtight gasket about said fastener.

2. The method of claim 1, wherein said applying step comprises spraying said sealant material onto the heated fastener, and further including the step of providing a low pressure zone for drawing off excess sealant.

3. The method of claim 1, wherein the step of heating includes heating at least the engaging surface and the threaded portion of the fastener to a temperature between about 450° F. and about 525° F.

4. The method of claim 1, wherein said sealant material is an olefin based material.

5. The method of claim 1, wherein said sealant material is a polyolefin based material.

6. The method of claim 1, wherein said sealant material is a thermoplastic having a specific gravity between about 0.95 and about 1.2.

7. The method of claim 1, wherein said sealant material is at least one of a finely powdered olefin and polyolefin coating material.

8. A method of making a reusable, self-sealing threaded fastener with a threaded shank and a head having an integral seal comprising the steps of:
    a. holding the fastener with the underside of said head defining a bearing surface and threaded shank exposed;
    b. heating at least the exposed bearing surface and threaded shank of said fastener to a temperature above the melting point of a sealant material to be applied to the fastener;
    c. spraying a powdered sealant material directly to the fastener in the exposed area adjacent the intersection of the shank and bearing surface whereby said sealant material melts on the exposed area adjacent the intersection of the shank and bearing surface of the fastener to form an integral sealing element on said fastener;
    d. drawing off excess powdered sealant material not applied to the fastener; and
    e. curing the sealant material prior to installation of said fastener into a receiving member; said installation causes said sealant to form a watertight and airtight gasket about said fastener.

9. The method of claim 8, wherein the step of heating includes heating at least the exposed bearing surface and the threaded shank to a temperature between about 450° F. and about 525° F.

* * * * *